United States Patent [19]

Pommier

[11] 4,187,686
[45] Feb. 12, 1980

[54] POWER GENERATOR UTILIZING ELEVATION-TEMPERATURE DIFFERENTIAL

[76] Inventor: Lorenzo A. Pommier, 3795 Roberta St., Los Angeles, Calif. 90031

[21] Appl. No.: 869,646

[22] Filed: Jan. 16, 1978

[51] Int. Cl.² .............................................. F03G 7/04
[52] U.S. Cl. ...................................... 60/647; 60/675; 60/641
[58] Field of Search ........................... 60/641, 675, 647

[56] References Cited

U.S. PATENT DOCUMENTS

| 196,759 | 11/1877 | Miller | 60/675 |
|---|---|---|---|
| 1,493,368 | 5/1924 | Merz | 60/641 |
| 3,953,971 | 5/1976 | Parker | 60/641 |
| 3,983,704 | 10/1976 | McFarland | 60/641 |

*Primary Examiner*—Allen M. Ostrager
*Attorney, Agent, or Firm*—Lyon & Lyon

[57] ABSTRACT

A power generator including a closed pressure resisting tubular loop having a lower warmed end and an upper cooled end joined by connecting penstock column and a return column, the tubular loop being filled with fluid under pressure, the critical point of which is between the temperatures of the cooled and warmed ends, to cause the fluid to convert to a liquid phase in the upper end for discharge into the penstock column, and cause the liquid to convert into a gas phase in the lower end, for discharge while in its gas phase into the return column so that circulation of fluid as it converts between its liquid and gas phases is continuous, and a hydraulic power unit driven by downwardly moving liquid in the penstock column, reacting to the hydrostatic pressure so generated.

11 Claims, 7 Drawing Figures

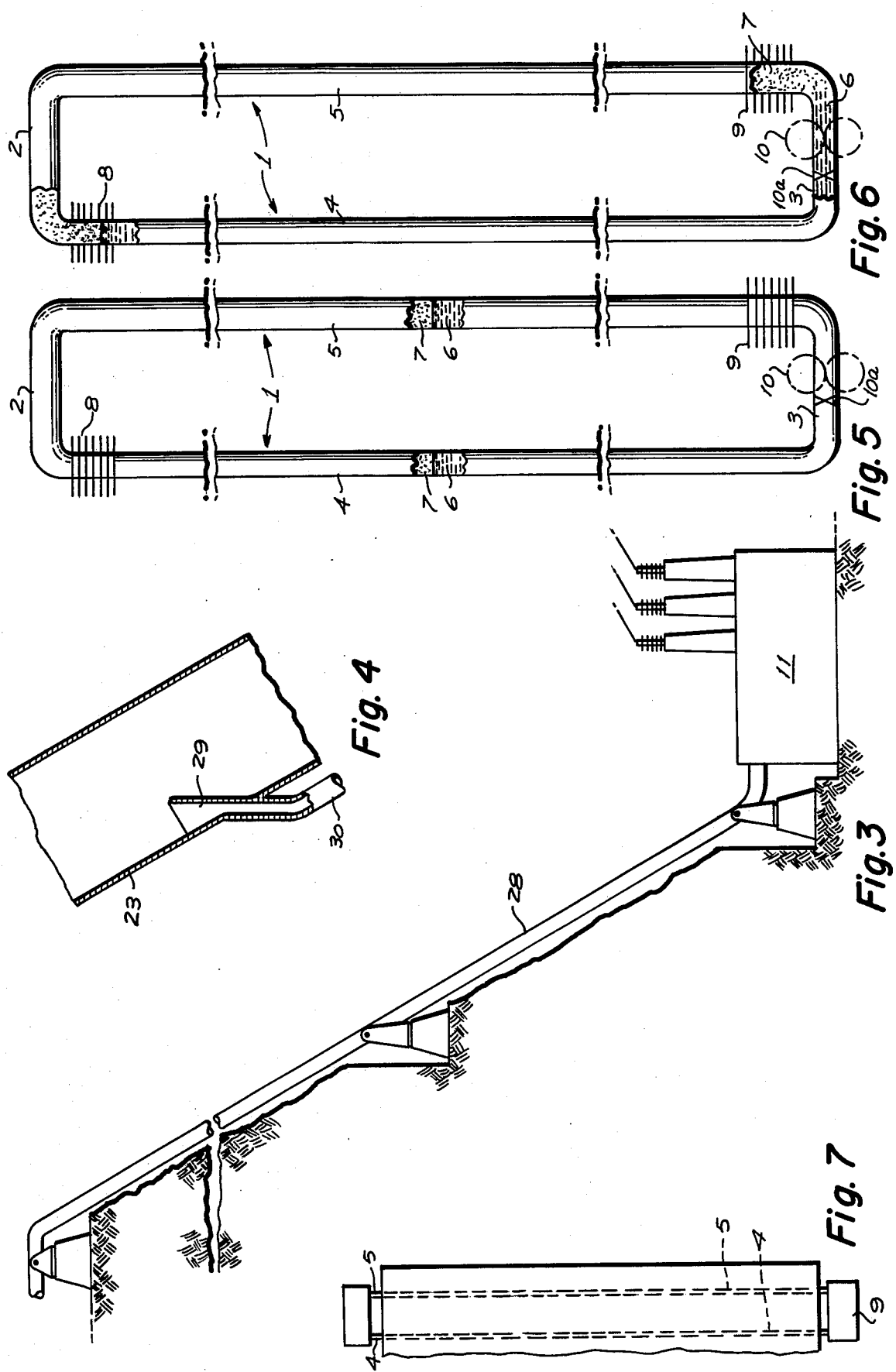

POWER GENERATOR UTILIZING ELEVATION-TEMPERATURE DIFFERENTIAL

BACKGROUND AND SUMMARY

Power generators utilizing, for example, temperature differences between two natural locations such as volcano or naturally heated underground water, or different temperatures at different ocean depths, have been in existence. The present invention utilizes the difference between ambient temperatures at different elevations, the difference between daytime and nighttime temperature, or generally low grade heat sources.

The present invention also utilizes large differences in elevation to obtain an increase in the availability of the energy contained in a working medium. The scale of this invention is large. Column heights of several hundred meters, or even several thousand meters are required to efficiently utilize temperature differentials commonly found in nature. As the scale is large, so is the power output potential. Megawatt outputs would be typical of a practical installation. These considerations are summarized in the following objects:

First, to provide a power generator wherein a pressure resisting closed tubular loop is subjected to ambient temperatures to establish an upper cooled end and a lower heated end joined by a penstock column and a return column, the closed loop containing a fluid under pressure, having a critical temperature between the ambient temperatures at the upper and lower ends, whereby the fluid condenses at the upper end for downward flow in liquid phase through the penstock column and evaporates at the lower end for upward flow in gaseous phase through the return column, the penstock column having one or more generators driven by the downwardly flowing fluid in its liquid phase.

Second, to provide a power generator, as indicated in the preceding object, wherein heat exchangers are disposed at the upper and lower ends of the loop and are of such capacity as to maintain an essentially constant movement of the fluid through variations in ambient temperature.

Third, to provide a power generator, as indicated in the preceding objects, wherein, but not by way of limitation, the lower end is a station disposed in a sun heated valley and the upper end is a station disposed on a mountain top.

BRIEF DESCRIPTION OF THE FIGURES

FIG. 3 is a side view at a reduced scale taken from 3—3 of FIG. 1.

FIG. 4 is a fragmentary sectional view of the penstock column.

FIGS. 5 and 6 are more simplified diagrammatical views in front aspect, FIG. 5 indicating an initial or balanced condition, and FIG. 6 indicating a power generating condition.

FIG. 7 is a simplified diagrammatical view of the power generator in association with a tall building.

DETAILED DESCRIPTION

Figure 1:
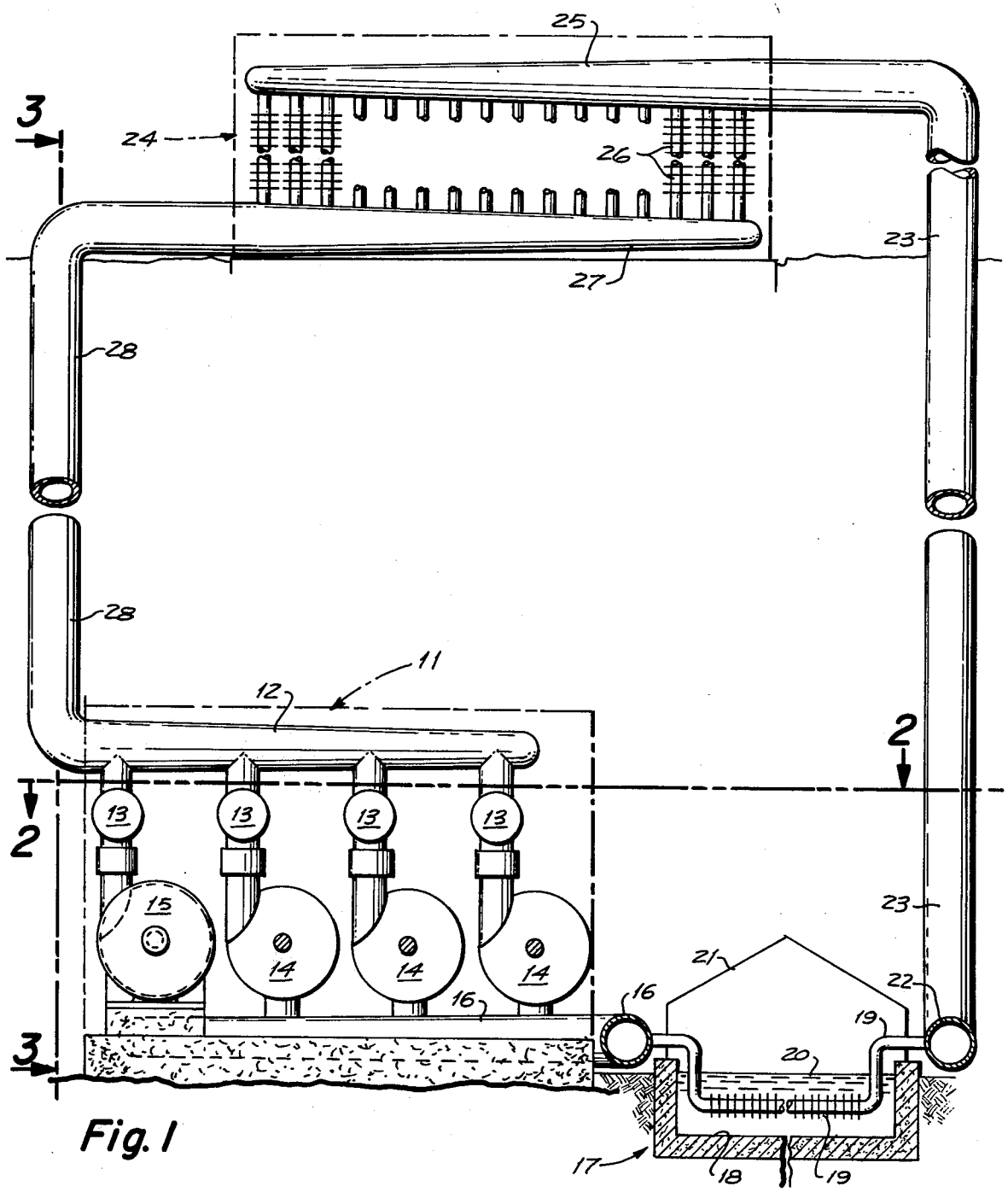
FIG. 1 is a diagrammatical front view of the power generator with portions in section.

Referring first to FIGS. 5 and 6: the power generator is in the form of a closed pressure loop 1; that is, the loop is formed of metal tubing capable of withstanding relatively high pressure. The loop includes an upper end 2 and a lower end 3 connected by a penstock column 4 and return column 5.

The pressure loop contains a fluid having a liquid phase indicated by 6 and a gaseous phase indicated by 7. At or adjacent the upper end of the penstock column 4 is a condensing heat exchanger 8; that is, the heat exchanger 8 is subjected to external cooling for the purpose of converting the fluid to its liquid phase 6. At or adjacent the lower end of the return column 5 there is provided an evaporating heat exchanger 9; that is, external heat is supplied through the heat exchanger to change the fluid from its liquid phase 6 to its gaseous phase 7.

At the lower end exposed to the fluid in its liquid phase is a hydraulic power unit 10, preceded by inlet valve 13.

STARTING PHASE

Assume a condition such as may atypically be the case if the temperature at the lower level 3 is the same as the temperature at the upper level 2. This is the condition represented in FIG. 5. The columns 4 and 5 are occupied by a medium (gasliquid) which has been chosen to have its critical temperature at or near the lower level 3 temperature. Such a medium may be carbon dioxide ($CO_2$) but other media are not hereby excluded.

Carbon dioxide has a critical temperature of 31.1° C. Assuming the temperature at the lower end 3 to be 31.1° C. and the temperature at the upper end 2 to be, atypically, the same, then both columns 4 and 5 will contain the fluid medium at the bottom 3 in its liquid state, but the fluid medium gradually decreases in density toward the top where both columns become gaseous. Both columns will, of course, exhibit the same relative densities and will generate the same pressure at the bottom.

Assume that the valve 10a is closed and that a rise in temperature at the bottom of column 5 occurs to, say, 33° C.; that is, a temperature just above the critical point for $CO_2$. As heat is added gradually to column 5 by the heat exchanger 9, the liquid-gas transition zone in column 5 gradually falls and the transition zone in column 4 will gradually rise until the fluid medium in column 5 has been completely gasified. Also assume that simultaneously the fluid medium entering column 4 is cooled by heat exchanger 8 and the gas-liquid transition zone in column 4 reaches the level of heat exchanger 8. This ends the starting phase.

RUNNING PHASE

Valve 13 is now open imposing upon the hydraulic motor 10 the differential of pressure between columns 4 and 5. Responding to this pressure differential, the hydraulic motor 10 will produce useful work as for example electrical energy.

The heat necessary to gasify one kilogram of $CO_2$ at 31° C. is 38.2 K calories. Thus, for every 38.2 K calories of heat supplied at the lower level 3, roughly one kilogram of gasified $CO_2$ will enter column 5. Assume that the hydraulic motor 10 is so regulated as to allow one kilogram of the fluid medium to pass for every 38.3 K calories supplied. Now, as each kilogram of fluid medium is added to the total content of return column 5, so does the pressure proportionately increase in column 5 except for that amount of material as is condensed out in the heat exchanger 8 and except as heat is absorbed in said heat exchanger 8 or as is absorbed by gravitational field of the earth as the gas rises in the column 5.

Stated in another way, let a principle in physical science called "Le Chatelier's Principle" be brought to witness in this instance. That "principle" states that if a stress is brought to bear on a system in equilibrium, the same system will react as to nullify the effect of that stress and in a direction opposite the direction of the stress. Applied to this invention, the conclusion is that if the system, as left at the end of the starting phase, is in equilibrium, and a stress in the form of additional heat is applied to column 5, a resulting change will occur in the system tending to reduce the stress of the added heat in the direction of passing out heat energy in one form or another and in venting out fluid medium wherever it can. Since the fluid medium has nowhere else to go except to be condensed to liquid and enter pipe column 4, so it will, without a shadow of a doubt. The above statement implies that there is no physical limit to the height of the column other than those imposed by the strength of the containing materials employed, or the temperatures of the heat sources available.

EXAMPLE OF A POWER PLANT UTILIZING CARBON DIOXIDE

A possible embodiment of this invention may take the form of a heat exchanger 9 at the lower station 3 operating at 31.5° C. and a heat exchanger 8, 1829 meters up, operating at 15.5° C. The pressure at the lower station 3 will be 7.39 M Pa. The pressure at the heat exchanger 8 at the upper station will be 5.15 M Pa.

Calculating according to the barometric formula for $CO_2$ where $p_2 = p_1 \times e^{kz}$ and k is the rate of pressure increase of such form as $k = (1/22.4) \times (1/101340) \times (273/288) \times 44 \times 9.806$ if:
$p_1 = 5.15$ M Pa
$e = 2.71828 \ldots$ the base of natural logarithms
$k = 0.00018$
$z = 1829$
so that
$p_2 = 5.15$ M Pa $\times 1.390 = 7.158$ M Pa.

Thus, applying the barometric formula for the increase of pressure for the difference in elevation of 1829 meters yields the results that a pressure less than the stated 7.39 M Pa can be expected at the lower end 3 and that condensation takes place as long as the stated temperature difference prevail.

Figure 2:
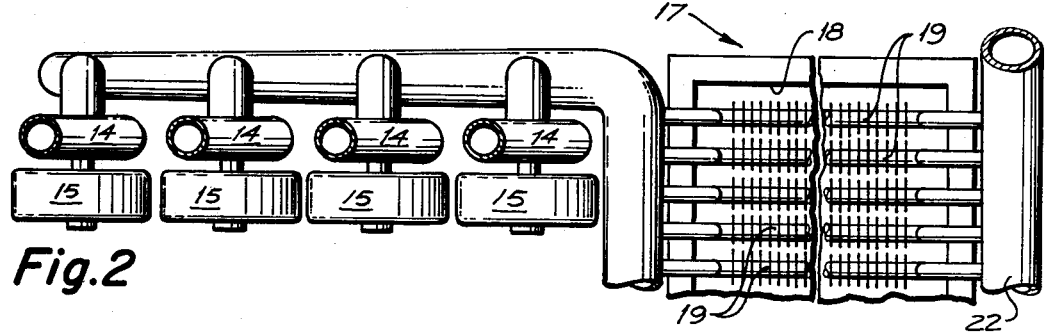
FIG. 2 is a fragmentary sectional view thereof taken through 2—2 of FIG. 1.

Referring to FIGS. 1, 2 and 3, a power station 11 intended to be placed at a lower level is indicated by outline. Within the power station is an intake manifold 12 connected to a series of inlet valves 13 which supply liquid to hydraulic motors 14. These motors may be either of the piston or rotary type. The hydraulic motors 14 drive alternators or generators 15 and discharge into an outlet manifold 16. The manifold 16 communicates with the heat exchanger 17 comprising a basin 18 having heat exchanger tubes 19 therein and filled with water 20. The basin 18 may be provided with a cover 21.

The heat exchanger tubes 19 communicate with an intake manifold 22 connected to the lower end of a return column 23. The return column extends upwardly at the side of a mountain to the mountain top providing a region of reduced ambient temperature.

Here, the return column communicates with a heat exchanger 24 having a distributor manifold 25 discharging into the heat exchanger tubes 26 which in turn are connected to a collector manifold 27 which in turn is connected to a penstock column 28. The penstock column extends down the mountainside to the intake manifold 12.

The intake manifold 12, valves 13, hydraulic motors 14, outlet manifold 16, heat exchanger tubes 19, intake manifold 22, return column 23, manifold 25, heat exchanger tubes 26, manifold 27 and penstock column 28 define a closed loop which is filled with a fluid such as carbon dioxide ($CO_2$) or other fluid having an appropriate critical temperature and pressure to establish a liquid phase in the penstock column 28 and a gaseous phase in the return column 23.

SPECIFICATIONS

Power average 100,000 Kw
Power maximum 120,000 Kw
Working height 1,500 meters
Fluid medium $CO_2$
Working temp. 31.1 deg. C.

The capacity of the lower heat exchanger 17 is such as to maintain a sufficient quantity of water at 43° C.

EQUIPMENT

The penstock column 28 is capable of withstanding an internal pressure of 20.7 M Pa. The inside diameter of the penstock column is 1.7 meters. The design velocity of the liquid $CO_2$ is 2 meters per second with a friction loss factor of 0.889 meters (head) per 100 meters. The total heat loss due to friction is estimated to be $0.889 \times 15 = 13.33$ meters. The selected distance from ground level to the upper heat exchanger 24 is 1,513 meters, while the pressure head is calculated at 1,500 meters.

The size of this heat exchanger basin 18 is estimated to be 100 meters long, 50 meters wide and 12 meters deep. This basin 18 when filled with warm water is estimated to provide $3 \times 60,000 \times 10^6 \times 4.184$ joules $= 7.5 \times 10^{11}$ joules of heat when allowed to drop 3 degrees C. This provides 1.74 hours of operation independent of the water supply, at the rate of 120,000,000 joules per second. The rate of flow of water in normal operation, through this basin, is estimated to be 575 meters cube per minute.

The heat exchanger is the finned tube variety and has a total of $1.27 \times 10^5$ $m^2$ of surface to provide for 120,000,000 joules of heat energy per second to be transferred.

The mechanical equipment for generating the power consists of four or more hydraulic motors 14 of the piston type commonly used in hydraulic machinery but adapted for use with carbon dioxide with respect to seals and rubbing surfaces. The speed of rotation is estimated to be 720 rpm. The estimated volume per machine will be 1.7 $m^3$ per second. The capacity per machines is 0.238 $m^3$. The capacity per cylinder is 0.056 $m^3$ for a 5 cylinder motor. The stroke is 40 cm. (0.4 m). The electrical equipment consists in part of four 60 Hz alternators each rated at 30,000 kilovolt-ampere, directly coupled to a corresponding hydraulic motor, an oil circuit breaker for each alternator, one or more step-up transformers to match power line voltage, one or more air-blast "disconnects" to isolate the plant from the power line in cases of emergency as is the normal practice in electrical power stations.

The plant includes an upper mountain top heat exchanger 26 for the purpose of providing flexibility in operation as for instance when the warm water supply drops in temperature from the optimum values for ideal heat efficiency. This condensor may have a multiplicity of risers some hundred meters in height to facilitate self-condensation whenever it occurs. The designed heat rejection capacity shall be $6 \times 10^7$ joules of heat per second. The method of heat rejection may be a combination of radiation to the night sky, and direct conduction by air. A surface area of 60,000 $m^2$ is appropriate for this standby function. In normal operation, the heat values shall be so balanced that most of the condensation will be effected by loss of energy of the fluid medium due to increase in elevation.

The return column 23 has a diameter of 2.4 m and is so constructed as to safely resist a pressure of $1.03 \times 10^7$ Pa. The design velocity of the rising gas is 2 m per sec. typical.

As shown in FIG. 4, the return column 28 may have pockets 29 every hundred meters starting at 1,000 meters elevation for the purpose of collecting the condensate that does not reach the top as may happen during sub-ideal condition. These pockets may be joined to one or more minor penstocks 30 for use with small auxiliary hydraulic motors, not shown. The purpose of this auxiliary system is to guarantee some capability at minimally favorable conditions and to increase efficiency at other times.

EXAMPLE OF POWER PLANT UTILIZING ETHENE

Specifications

Power average 60,000 Kw
Power maximum 72,000 Kw
Working height 1,500 meters
Fluid medium $C_2H_4$
Working temp. 9.8° C.

Water or ambient air is the heat source. For around the clock operation, a small body of water containing in excess of $10^6 m^3$ of water is sufficient. The water temperature can be a few degrees cooler than 25° C., but for best results, 25° C. is the optimum temperature.

EQUIPMENT

The working pressures are about 0.75 of that of $CO_2$, the penstock 28 need not be quite as strong, but on the other hand, greater safety precautions need to be applied. Other than that, the rest of the equipment remains basically the same as for $CO_2$. Since Ethene is critical at even cool temperatures, a system for cooling the liquid phase should be incorporated in the design. A coating of at least 0.5 meter of fiberglass and magnesia is mandatory. Several independent cooling coils are required to be wound around the penstock for its complete length. The medium fluid itself may be used as a refrigerant, the gas produced is to be repressurized and returned to the gas phase of the main system.

Under normal working conditions, very little refrigeration is required since the rising gases cool upon rising and expanding so that condensation takes place at the stated 9.8 degrees C. However, in case of interruption of operation for whatever cause, the refrigeration system would then have to go immediately into operation to save the Ethene from being vented to the atmosphere.

Venting tanks or pits must also be modified to ensure the exclusion of oxygen as Ethene is extremely flammable and may even detonate to certain proportions. However, in spite of these safety considerations, the process is not any more dangerous than extreme pressure steam systems.

The power station takes on a slightly different aspect also as the hydraulic motors are preferably isolated from any electric circuitry that may spark or heat up. Therefore, a separate building for the motors is mandatory along with whatever containing methods and detecting methods are deemed necessary to ensure safe operation.

Referring to FIG. 4, if desired, one or more auxiliary penstocks 29 may be connected with diverters 30. Such auxiliary penstocks may serve as control or sensing means for the main penstock.

Referring to FIG. 7, the power generator may be installed in or adjacent a tall building 31 providing the ambient temperatures at the top and bottom thereof differ sufficiently to maintain operation. Such generator is indicated diagramatically as including a penstock column 4, a return column 5, an upper heat exchanger 8 and a lower heat exchanger 9. The other elements indicated in FIGS. 5 and 6 and in FIGS. 3-5 are omitted to simplify the illustration.

Having fully described my invention, it is to be understood that I am not to be limited to the details herein set forth, but that my invention is of the full scope of the appended claims.

I claim:

1. A power generator, utilizing a lower region maintained at an upper temperature, and an upper region maintained at a lower temperature, the power generator comprising:
   a. a tubular closed loop system including an upper zone at said upper region, and a lower zone at said lower region, and a penstock column and a return column connecting the zones to complete the loop system;
   b. a fluid under pressure sealed in the loop system, the fluid being at a preselected upper pressure and temperature at the lower zone and at a preselected lower pressure and temperature at the upper zone, the fluid having a critical gas-liquid conversion pressure temperature between the pressure-temperature at the lower zone and the pressure-temperature at the upper zone;
   c. a condensing heat exchanger at the upper zone for converting said fluid from a gaseous state to a liquid state for movement of the fluid in a liquid state into the penstock column to create a liquid head causing downward movement of the liquid therein;
   d. an evaporating heat exchanger at the lower zone for converting said fluid from a liquid state to a gaseous state for movement of the fluid in a gaseous state up the return column, whereby continuous circulation of fluid is maintained in the loop system;
   e. and at least one hydraulic motor is positioned for engagement by the liquid phase moving in the penstock column.

2. A power generator, as defined in claim 1, wherein:
   a. the power generator is geographically disposed with the lower region located in a depressed region of the earth having a warm ambient temperature and the upper region located at an elevated region of the earth having a cool ambient temperature, and a hillside extends therebetween to support the penstock column and return column.

3. A power generator, as defined in claim 1, wherein:
   a. the power generator is disposed essentially in vertical relation to a multi-story building of such height as to expose the upper zone to a region of cool ambient temperature, and expose the lower zone to a region of warm ambient temperature.

4. A power generator, as defined in claim 1, wherein:
a. a plurality of hydraulic motors and power generators are disposed at the lower zone;
b. and the evaporative heat generator includes a basin supplied with water at ambient temperature and includes heat absorbing conduits at such temperature so as to convert the fluid from its liquid phase to its gaseous phase.

5. A power generator, as defined in claim 1, wherein:
a. the pressurized fluid is carbon dioxide.

6. A power generator, as defined in claim 1, wherein:
a. the pressurized fluid is ethene.

7. A power generator utilizing a lower region at higher ambient temperature and an upper region at lower ambient temperature, the power generator comprising:
a. a tubular closed loop system, including an upper zone disposed at said upper region of lower ambient temperature, a lower zone disposed at said lower region of higher ambient temperature, a penstock column and a return column connecting the upper and lower zones;
b. a pressurized fluid completely filling the loop system and having a critical gas-liquid conversion pressure-temperature intermediate the ambient temperatures and the pressures at the upper and lower zones of the loop system;
c. a first heat exchanger at the lower zone for converting the pressurized fluid from liquid to gas for discharge into the lower end of the return column and upward movement therein;
d. a second heat exchanger at the upper zone for converting the pressurized fluid from gas to liquid phase for discharge into the upper end of the penstock column and downward movement therein;
e. and at least one hydraulic motor positioned for operation by the liquid phase fluid moving in the penstock column.

8. A power generator, as defined in claim 7, wherein:
a. the lower and upper regions are geological sites connected by a sloping surface, said surface supporting the penstock and return columns.

9. A power generator, as defined in claim 7, wherein:
a. the regions are located at the bottom and top of a multi-storied structure of sufficient height to maintain a temperature differential between the lower and upper regions.

10. A power generator as defined in claim 1 including a pocket in the return column, said pocket collecting from the gaseous fluid, fluid liquifying prior to reaching the upper zone, and said pocket being connected with an auxiliary penstock, said penstock feeding a hydraulic motor.

11. A power generator as claimed in claim 7 including a pocket in the return column, said pocket collecting from the gaseous fluid, fluid liquifying prior to reaching the upper zone, and said pocket being connected with an auxiliary penstock, said penstock feeding a hydraulic motor.

* * * * *